United States Patent [19]

Iwanami

[11] Patent Number: 4,766,853

[45] Date of Patent: Aug. 30, 1988

[54] INTAKE PASSAGE FOR MULTI-CYLINDER ENGINE

[75] Inventor: Takeshi Iwanami, Hamakita, Japan

[73] Assignee: Yamaha Hatsudoki Kabushiki Kaisha, Iwata, Japan

[21] Appl. No.: 22,662

[22] Filed: Mar. 6, 1987

[30] Foreign Application Priority Data

Mar. 8, 1986 [JP] Japan .................................. 61-51041

[51] Int. Cl.$^4$ .............................................. F02B 75/18
[52] U.S. Cl. .................................. 123/52 M; 123/308; 123/432
[58] Field of Search .......... 123/52 M, 52 MB, 52 MV, 123/308, 302, 432

[56] References Cited

U.S. PATENT DOCUMENTS

| | | | |
|---|---|---|---|
| 1,763,726 | 6/1930 | Timian | 123/52 MB |
| 1,890,567 | 12/1932 | Baverey | 123/52 MB |
| 2,126,649 | 8/1938 | Lytle et al. | 123/52 MB |
| 2,172,957 | 9/1939 | Firth | 123/52 MB |
| 2,315,215 | 3/1943 | Maybach | 123/52 MB |
| 2,323,442 | 7/1943 | Beard | 123/52 MB |
| 2,766,743 | 10/1956 | Platner et al. | 123/52 MB |
| 2,862,490 | 12/1958 | Trisler | 123/52 MB |
| 2,916,027 | 12/1959 | Chayne et al. | 123/52 MB |
| 3,146,764 | 11/1964 | Elsbett . | |
| 3,370,575 | 2/1968 | Soubis . | |
| 3,441,008 | 4/1969 | Nelson . | |
| 3,491,733 | 1/1970 | Soubis . | |
| 3,796,048 | 3/1974 | Annus et al. . | |
| 3,943,906 | 3/1976 | Hirose et al. . | |
| 4,030,459 | 6/1977 | Hori et al. . | |
| 4,300,488 | 11/1981 | Cser . | |
| 4,353,211 | 10/1982 | Cser et al. . | |
| 4,510,896 | 4/1985 | Rutschmann . | |
| 4,549,506 | 10/1985 | Rush, II et al. | 123/52 MB |
| 4,622,926 | 11/1986 | Rutschmann et al. | 123/52 MB |

FOREIGN PATENT DOCUMENTS

| | | | |
|---|---|---|---|
| 647884 | 7/1937 | Fed. Rep. of Germany | 123/52 M |
| 56-115818 | 9/1981 | Japan | 123/52 MB |
| 127850 | 1/1919 | United Kingdom | 123/52 MB |

Primary Examiner—E. Rollins Cross
Attorney, Agent, or Firm—Ernest A. Beutler

[57] ABSTRACT

An improved induction system for a V type engine that is tuned for substantially all running conditions and which is nevertheless compact in construction. The system includes a pair of plenum chambers each disposed adjacent one of the cylinder heads of the engine. Each cylinder head has at least two intake passages serving the respective cylinder bores and a first conduit extends from the adjacent plenum chamber to one of the intake passages and a second conduit extends from the other of the plenum chambers to the other intake passage. The plenum chambers communicate with each other at their opposite ends to improve air flow and a common inlet opening serves each plenum chamber inlet. A throttle valve arrangement is also incorporated so that good performance is achieved under all running conditions. The throttle valve arrangement includes a throttle valve that controls the flow through the interconnecting passage.

20 Claims, 4 Drawing Sheets

INTAKE PASSAGE FOR MULTI-CYLINDER ENGINE

BACKGROUND OF THE INVENTION

This invention relates to an intake passage for a multi-cylinder engine and more particularly to an improved intake system for multi-cylinder engines.

It has been proposed with multi-cylinder engines to employ an induction system that incorporates a plenum chamber for supplying a charge to the combustion chambers of the engine. The plenum chamber tends to damp out pulsations in the intake charge and avoids a loss of volumetic efficiency. However, it has been found that the provision of a single air intake for the plenum chamber tends to restrict the breathing capacity of the engine at high speeds and, accordingly, can reduce the high speed output of the engine. In order to overcome these difficulties, it has been proposed to employ an intake system that includes a pair of atmospheric air inlets for the plenum chamber. However, it has been found that the use of plural atmospheric inlets for the plenum chamber, even though it may increase the maximum performance of the engine, tends to provide a dip or valley in the mid-range torque curve.

It is, therefore, a principal object of this invention to provide an improved intake system for an internal combustion engine employing a plenum chamber.

It is a further object of this invention to provide an improved intake system for an internal combustion engine wherein the plenum chamber is provided with a plurality of controlled inlets for improving the mid-range torque of the engine.

Because of the compromise in the normal design of the length and cross-sectional area of the intake passages for an internal combustion engine, it has been suggested to improve the engine performance by providing a compound induction system that includes a pair of differently tuned intake passages for serving each combustion chamber. In accordance with such an arrangement, it is also desirable to provide plenum chambers for serving the different length intake passages. Such a system is shown in copending application Ser. No. 634,795, filed July 26, 1984, in the names of Masatoshi Ohmi et al, entitled "Intake Means Of Internal Combustion Engine", and assigned to the assignee of this application. This type of induction system is a substantial improvement over prior art systems but still offers the opportunity for further improvement, particularly in maximum output. For example, there is disclosed in copending application Ser. No. 002,730, filed Jan. 14, 1987, in the names of Iwao Masumoto et al, entitled "Intake System For Multi Cylindered Engine" and assigned to the assignee of this application an arrangement wherein each plenum chamber has plural inputs to increase maximum power output. Such compound systems using plenum chambers and plural air inlets may, in some instances, present some of the disadvantages as aforenoted with respect to valleys in mid-range torque.

It is, therefore, a still further object of this invention to provide an improved induction system for internal combustion engines having compound intake passages.

It is a further object of this invention to provide an improved intake system for a multi-cylinder engine that will improve performance throughout the entire engine load and speed ranges.

SUMMARY OF THE INVENTION

A first feature of this invention is adapted to be embodied in an intake system for an internal combustion engine that comprises at least one variable volume chamber having at least one intake port for delivering a charge thereto. A plenum chamber is incorporated and at least one intake passage extends from the plenum chamber to the intake port. First and second atmospheric air inlets are provided for the plenum chamber and throttle valve means control the flow into the plenum chamber through each of the atmospheric air inlets.

Another feature of the invention is adapted to be embodied in an induction system for an internal combustion engine that has at least two cylinders. There are incorporated first and second plenum chambers and conduit means deliver a charge from the plenum chambers to the cylinders for induction thereto. In accordance with this feature of the invention, a pair of spaced atmospheric inlets are provided for each of the plenum chambers and throttle valve means control the flow into each of the plenum chambers through one of the atmospheric air inlets independently of the other of the atmospheric air inlets.

DETAILED DESCRIPTION OF THE PREFERRED EMBODIMENTS

Figure 1:
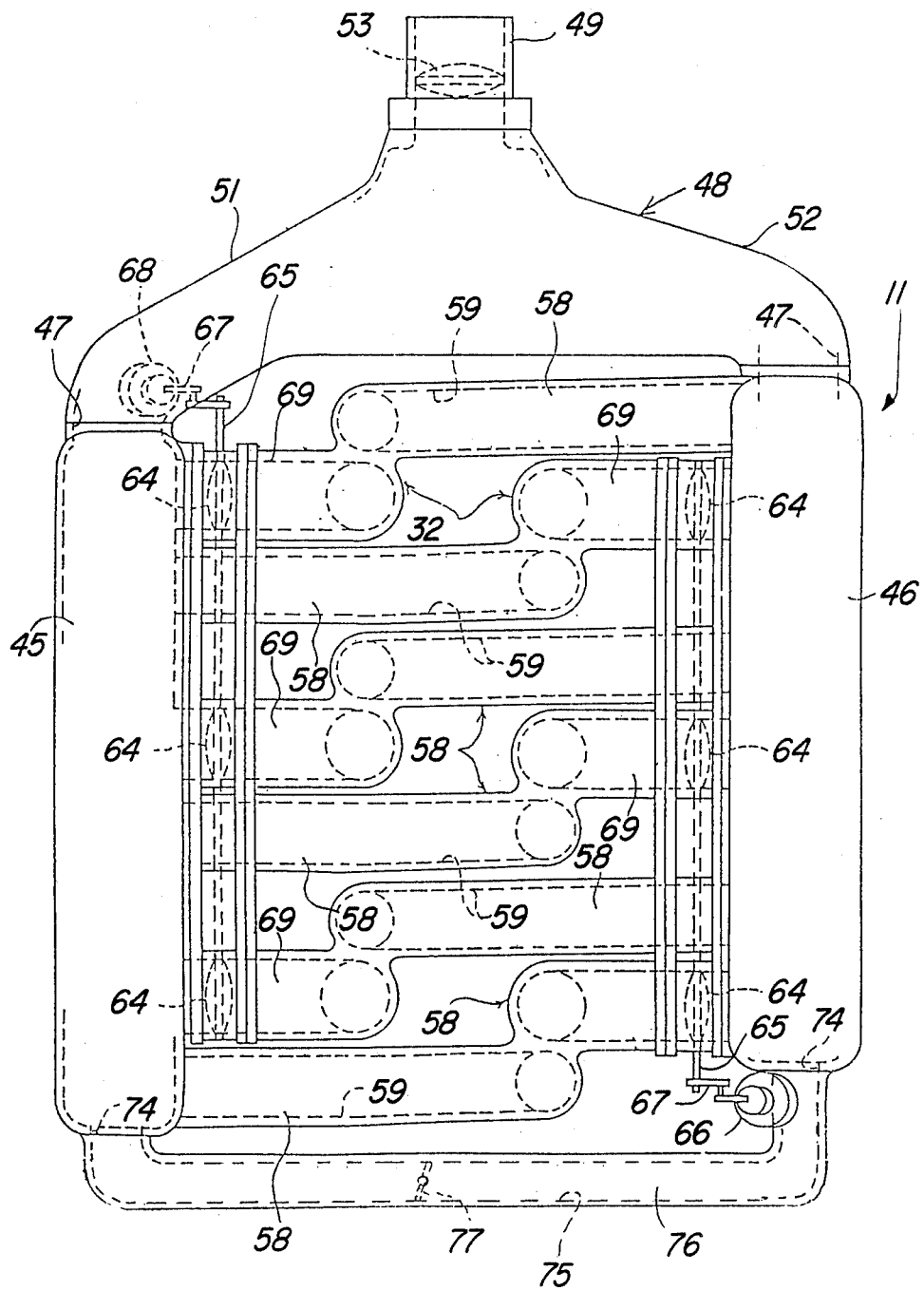
FIG. 1 is a top plan view of an internal combustion engine constructed in accordance with a first embodiment of the invention.
Figure 2:
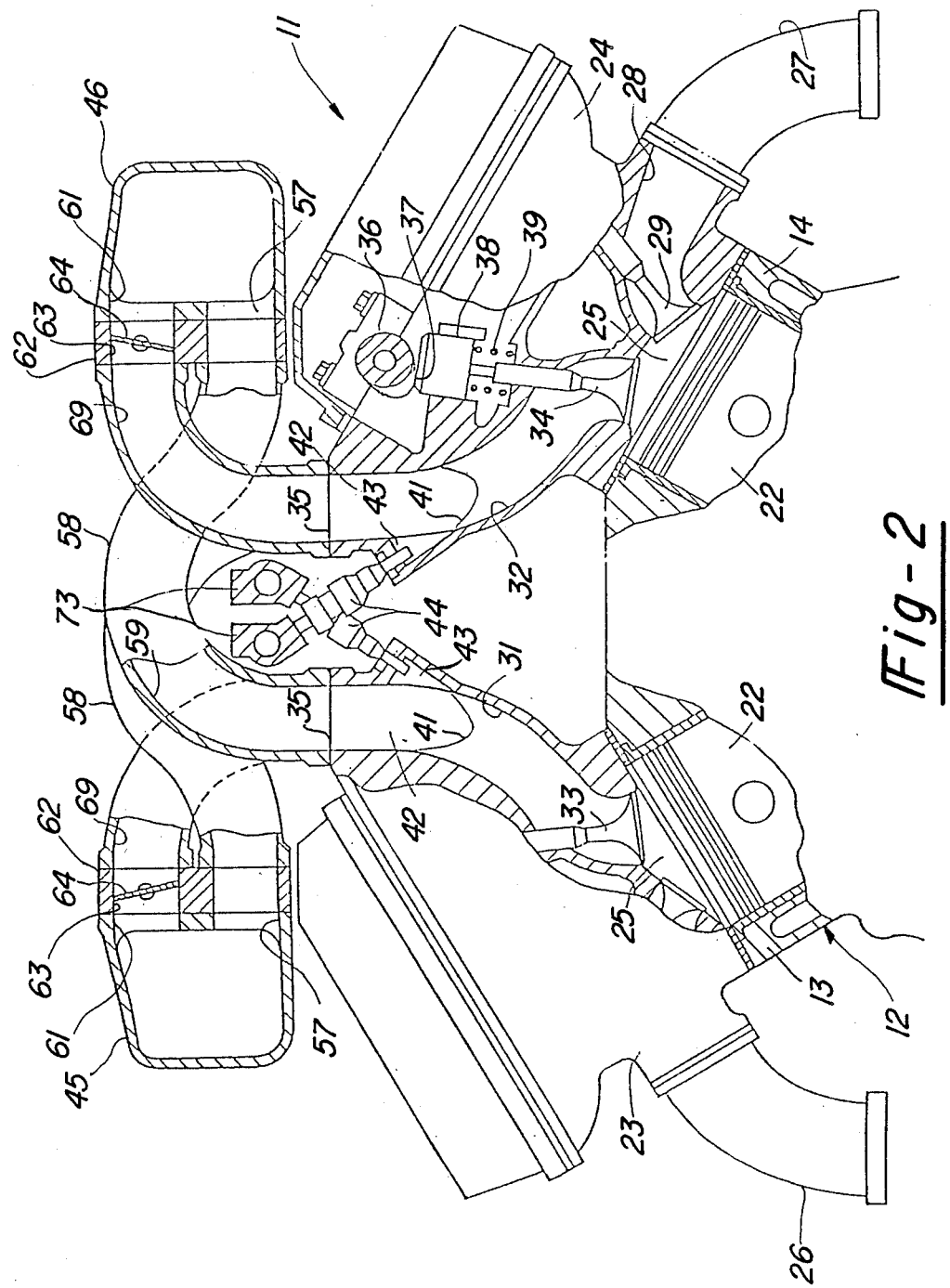
FIG. 2 is an enlarged cross-sectional view of the engine.
Figure 3:
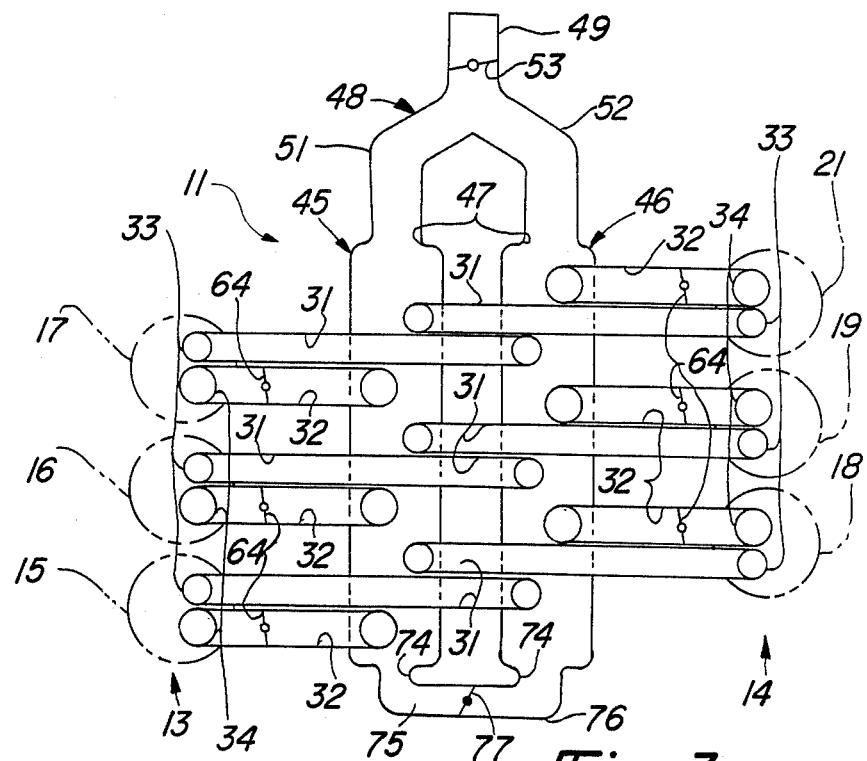
FIG. 3 is a top plan view showing, in a schematic form, the induction system of this embodiment.

Referring first to FIGS. 1 through 3, the reference numeral 11 indicates generally an internal combustion engine constructed in accordance with an embodiment of the invention. In the illustrated embodiment, the engine 11 is of the "V" type and includes a cylinder block 12 having angularly inclined banks 13 and 14. In the illustrated embodiment, the engine 11 is of the V6 type and each cylinder bank 13 and 14 defines three cylinder bores, as will be described. The cylinder bores of the bank 13 are disposed at an angle to those of the bank 14 and in the illustrated embodiment, this angle is 60°. It is to be understood, however, that the invention and certain facets of it are useful with engine of other configurations and engines in which the angle between the banks is other than 60°. The invention, however, has particular utility in conjunction with V type engines and particularly those in which a very narrow or relatively shallow cylinder bank angle is employed.

The cylinder bank 13 is provided with three cylinder bores, as has been noted, which cylinder bores are shown as circles in FIG. 3 and are identified by the respective numerals 15, 16, and 17. In a like manner, the cylinder bank 14 is also formed with three cylinder bores which are shown in circles and which are identified by the reference numerals 18, 19 and 21. Pistons 22 (FIG. 2) are reciprocally supported in each of the cylinder bores 15 through 19 and 21 and are connected to a crankshaft (not shown) in a known manner as by means including connecting rods.

A cylinder head, indicated generally by the reference numeral 23, is affixed in a known manner to the cylinder bank 13. In a like manner, a cylinder head, indicated generally by the reference numeral 24, is affixed to the cylinder bank 14. Each cylinder head 23 and 24 has a recessed cavity 25 formed therein for each of the cylinder bores. The cavities 25, pistons 22 and cylinder bores 15 through 19 and 21 form the combustion chambers of the engine and the reference numerals 25 will be, at times, referred to as the combustion chambers.

The combustion chambers 25 are generally hemispherical in shape and each chamber is provided with a pair of exhaust passages formed in the respective cylinder head 23 or 24 which extend from the chambers 25 and which are adapted to cooperate with respective exhaust manifolds 26 and 27. These exhaust passages are identified by the reference numeral 28 and are shown only in FIGS. 2. Exhaust valves 29 are reciprocally supported in each of the cylinder heads 23 and 24 and control the communication of the cylinder head exhaust passages 28 with the combustion chambers 25. The exhaust valves 29 associated with each cylinder bore 15 through 19 and 21 are operated in unison in a suitable manner as by means of an overhead mounted camshaft (not shown).

On the opposite sides of the hemisphere from the exhaust valves 29, the cylinder heads 23 and 24 are provided with a pair of intake passages 31 and 32 for each chamber 25. The passages 31 terminate at an intake valve 33 while the passages 32 terminate at an intake valve 34. The portion of the passages 31 and 32 which extend through the respective cylinder heads 23 and 24 are substantially identical in construction except as hereinafter noted and they each terminate in a generally horizontally extending surface 35 of the respective cylinder head.

The intake valves 33 and 34 are, like the exhaust valves 29, operated by means of respective overhead mounted camshafts 36, each supported for rotation in the respective cylinder head 23 or 24 in a known manner. The intake camshafts 36 have lobes 37 that cooperate with thimble tappets 38 so as to operate the valves 33 and 34 in a known manner. Coil compression springs 39 are provided for urging the valves 33 and 34 toward their closed positions.

As may be readily seen from FIG. 2, the cylinder head intake passages 31 and 32 are separated from each other by a boundary wall 41 that extends from the valve seats and for a portion of the length of the passages 31 and 32. However, this wall terminates short of the cylinder head face 35 so as to provide an open area 42 of limited length through which the passages 31 and 32 may communicate with each other, for a reason to be disclosed. In this communicating area 42, each cylinder head is provided with a recess 43 into which a fuel injection nozzle 44 extends. The nozzles 44 discharge in the downstream direction and because of their central placement, there will be good fuel distribution balance between the intake passages 31 and 32.

The induction system for the engine 11 further includes a first plenum chamber 45 that is juxtaposed to and positioned above the cylinder head 23 of the cylinder bank 13. A second, generally similar plenum chamber 46 is disposed adjacent and immediately above the cylinder head 24 of the cylinder bank 14. The plenum chambers 45 and 46 have inlet openings 47 at their forward ends which receive atmospheric air from an intake device, indicated generally by the reference numeral 48 and which has a generally Y shape in top plan. The intake device 48 has a common throat portion 49 from which branches 51 and 52 extend to the respective plenum chambers 45 and 46. A manually operated throttle valve 53 is supported in the throat 49 and is connected by a suitable linkage to the operator control for controlling the air flow into the induction system. A suitable air cleaner (not shown) is positioned upstream of the throat device 49 for filtering the intake air and for achieving such silencing as may be desired.

The lower portion of each plenum chamber 45 and 46 is provided with respective outlet openings 57, there being one such opening 57 for each cylinder of one bank of the engine. The openings 57 communicate with elongated conduits 58 which have internal passages 59 and which extend from each opening 57 to an induction passage 31 of the opposing cylinder bank. That is, the plenum chamber 45 serves the intake passages 31 of the cylinder head 24 while the plenum chamber 46 serves the intake passages 31 of the cylinder head 23. As a result, a relatively long air flow path is provided which gives the opportunity to insure laminar flow through the induction system so that the passages consisting of the plenum chambers 45 or 46, passages 59 and cylinder head intake passages 31 may be tuned so as to give good running characteristics at low and mid-range running.

Each plenum chamber 55 is also provided with a plurality of outlet openings 61, there being one such opening for each cylinder of one bank of the engine. The openings 61 communicate with respective valve bodies, indicated generally by the reference numberal 62, which are affixed in a suitable manner to the plenum chambers 45 and 46. The valve bodies 62 have a number of passages 63 that are equal in number to the openings 61 and which directly communicate with these openings. Throttle valves of the butterfly type 64 are supported in each of the valve body openings 63 on a common throttle valve shaft 65. In this way, the throttle valves 64 associated with plenum chambers 45 and 46 will be operated in unison.

At one end of the engine 11, the throttle valve shaft 65 associated with the plenum chamber is extended and is connected by means of a linkage system 66 to a vacuum motor 67. The vacuum motor senses induction system vacuum downstream of the throttle valve 64. The construction and operation of the vacuum motor 67 is such that the throttle valves 64 will be held in their closed position until induction system pressure increases (manifold vacuum decreases) so as to indicate that the engine has approached its maximum power output or power demand condition. Then the valves 64 will be opened.

The throttle valve shaft 65 of the valve body 62 associated with the plenum chamber 46 extends from the other end of the engine and is also connected to a vacuum actuator 67 by means of a linkage system 66 so as to be operated in the same manner as that associated with the plenum chamber 45.

The valve body induction passages 63 communicate with induction passages 69 that each extend to the intake passages 32 of the adjacent cylinder head. Hence, the plenum chamber 45 serves the intake passages 32 of the cylinder head 23 while the plenum chamber 46 serves the intake passages 32 of the cylinder head 24. Hence, these intake passages can be kept very short to permit tuning for maximum power output.

It should be noted that the conduit passages 59 and 69 serving the intake passages 32 and 31, respectively, are separated from each other by respective walls. Hence, there is only a relatively short area of open communication (the area 42) between the respective conduits serving the cylinder head intake passages 31 and 32. This short but nevertheless open communication has been found to be extremely important in assuring good running during transition from mid-range to wide open performance.

In addition to having a common throttle valve 53 that controls the flow of intake air to the plenum chambers 45 and 46, the intake device 48 is also provided with a single flow sensor (not shown), which may be of vane type, and which senses the air flow into the induction system. This sensor 72 is connected through a suitable control system for controlling the amount of flow delivered to the injection nozzles 44 through a pair of fuel manifold 73 that are disposed in proximity to the cylinder heads 23 and 24 and injection nozzles 44. The specific construction for controlling the fuel flow may be of any known type.

The operation of the induction system will now be described. During low speed running, the manually operated common throttle valve 53 will be operated under the operator's control and will be opened only to a small degree. There will be a relatively high induction system vacuum exerted on the vacuum motors 67 so as to hold the throttle valves 64 in their closed positions. Hence, substantially all of the induction air for the engine will be supplied through the inlet device 48 to the plenum chambers 45 and 46 and specifically to their outlets 57. This air is transferred from the plenum chamber 45 through the relatively long conduits 58 and passages 59 to the induction passages 31 of the cylinder head 24. In a like manner, the plenum chamber 46 will serve the induction passages 31 of the cylinder head 23. Hence, as has already been noted, a relatively long air path is provided that will insure laminar flow. However, the air flow will flow through a relatively small cross-sectional area of the total induction system area serving each cylinder bore 15 through 19 and 21 so that the induction will be at a high velocity. This will insure a rapid rate of flame propagation in the chambers which insures that there will be good combustion. If desired, the passages 57, 59 and 31 may have a smaller cross-sectional area than the passages 61, 63, 69 and 32.

As the load on the engine increases and the manually operated throttle valve 53 is progressively opened, there will be a good point when the passages 31 cannot supply the full charge requirements of the combustion chambers 25. This occurs at a point before that at which the throttle valves 64 are opened. At this point, induction charge may flow through the communicating area 42 to enter the chambers 25 through both the induction passages 31 and 32 and intake valves 33 and 34 of the cylinder head. As has been previously noted, this communication provides significantly improved mid-range performance since it eliminates or substantially reduces the dip which would otherwise occur in the torque curve of the engine at this point.

As the load continues to increase, and the throttle valve 53 is progressively opened, the induction system vacuum will eventually reach a point where the vacuum motors 67 no longer hold the control valves 64 in their closed position and these valves will open. Thus, the effective area of the induction system serving each cylinder bore 15 through 19 and 21 will substantially increase and a very good maximum output can be achieved. Furthermore, as has been noted, the passages 69 which serve the intake ports 32 are relatively short and will offer low flow resistance and may be tuned so as to achieve the desired flow under this running condition.

The construction as thus far described may be considered to be substantially the same as that described in co-pending application Ser. No. 634,795. In accordance with this type of construction, even though the overall performance has been found to be improved significantly from conventional prior art engines, it is believed there can be further improvement.

It has been found that the torque can be improved by improving the breathing capacity of the individual plenum chambers 45 and 46 as noted in copending application Ser. No. 002,730. The vacuum existing in the plenum chambers 45 and 46 has been found to increase under mid-range running. This is believed to exist due to restrictions in the air flow into the plenum chambers 45 and 46 and also because of reverse flow which has been found to occur in the plenum chambers under this condition. That is, there is some interference between the flow to the individual cylinders served by the plenum chamber passages 57 under this running condition. In accordance with Ser. No. 002,730, an arrangement is provided for incorporating an additional air intake into each of the plenum chambers 45 and 46 which has been found to significantly improve performance under this running condition without adversely effecting the running under other conditions.

That system employs a pair of rearward air inlet openings 74 are provided with one such opening being formed at each rear end of the plenum chambers 45 and 46. The openings 74 provide an additional source of air flow which reduces the restrictions of air flow into the plenum chambers 45 and 46 and, furthermore, reduces the reverse flow which may be incorporated with the plenum chambers. The openings 74 have a smaller cross-sectional area than the opening 47. An interconnecting passageway 75 is formed within a connecting manifold 76 that is bolted to the rear end of the plenum chambers 45 and 46, so that the plenum chambers 45 and 46 may communicate with each other at the end opposite the forward inlet openings 47. Because of the firing order of the engine, the connecting passageway 75 permits the plenum chambers 45 and 46 to serve each other when each one of them is serving an individual cylinder and hence there can be good air flow into each air chamber 45 and 46. In addition, because of this interconnection, all of these separate atmospheric inlets provided by the openings 47 and 74 are served by the same throttle valve 53 and air cleaner 54 so as to simplify the overall construction.

Figure 5:
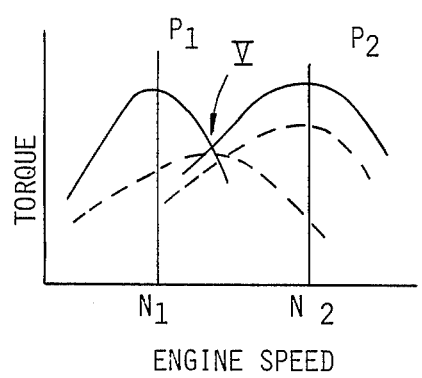
FIG. 5 is a graphical view showing the torque versus engine speed curve of an engine constructed in accordance with the prior art.

The induction system of the type as thus far described is substantially the same as that in copending application Ser. No. 002,730 which disclosure is incorporated herein by reference. FIG. 5 is a graphical view showing the torque engine speed curve for that engine with the line $P_1$ indicating the torque curve for the engine without the interconnecting manifold passageway 75. Curve $P_2$ shows the torque curve for the engine with the passageway 75. It will be seen that the torque curves $P_1$ and $P_2$ have peak torque at the respective engine speeds $N_1$ and $N_2$. However, because of the superimposition of the torque curves on each other, there is a valley V at midrange performance which can be undesirable.

Figure 6:
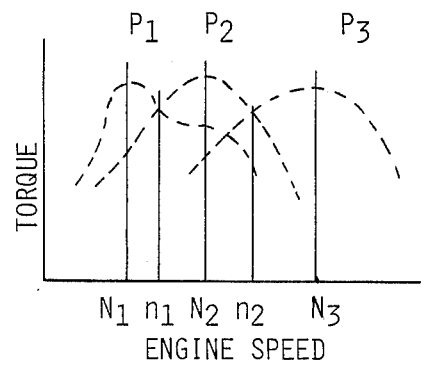
FIG. 6 is a torque speed curve showing the performance in accordance with an embodiment of the invention.

In accordance with the invention, there is provided a throttle valve 77 in the communicating passageway 75 that is controlled automatically in a suitable manner, as in response to engine speed, so as to be closed at low engine speeds and then to open at high engine speeds. FIG. 6 shows the result of the incorporation of this throttle valve. In FIG. 6, the torque $P_1$ again represents the torque curve of the engine when the throttle valves 64 are closed and also when the throttle valve 77 is closed. The torque curve $P_2$ indicates the torque curve which results when the throttle valves 64 are maintained closed and when the throttle valve 77 is opened. Therefore, in order to obtain a better torque curve, the throttle valve 77 is maintained closed until the engine speed $n_1$ and then the throttle valve 77 are opened automatically in a suitable manner, as by a speed responsive vacuum motor or the like. Thus, the torque curve is improved and at the point $N_2$ there is good torque. When the torque curve $P_2$ begins to fall off, the throttle valves 64 are opened at the speed $n_2$ and the torque curve $P_3$ then results. Therefore, it should be seen that the staged openings of the throttle valves 64 and 77 in effect reduces the valley in the torque curve and provides a significantly improved performance.

Figure 4:
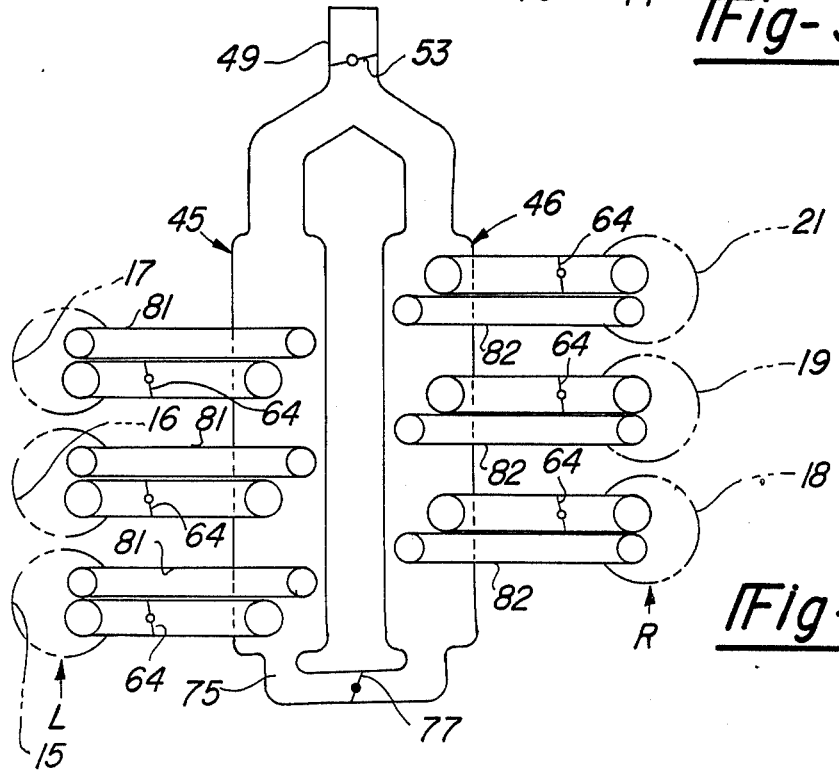
FIG. 4 is a schematic top plan view, in part similar to FIG. 3, showing another embodiment of the invention.

In the embodiment as thus far described, the different length intake passages serving each of the combustion chambers were employed by utilizing intake passage extending from each of the plenum chambers 45 and 46 to each combustion chamber. However, the system can also be incorporated in an induction system wherein each plenum chamber serves each cylinder of the engine and FIG. 4 shows such an embodiment. In this embodiment, the main components of the engine are the same and they have been identified by the same reference numeral.

In this embodiment, the high speed intake passages including the throttle valves 64 serve the chambers 15, 16 and 17 from the plenum chamber 45 and the cylinders 18, 19 and 21 from the plenum chamber 46. In accordance with this embodiment, there are also provided longer intake passages 81 which serve each of the cylinders 15, 16 and 17 from the plenum chamber 45. The passages 81 may be made longer by appropriately curving them, by having them enter into the plenum chamber 45 at a different location or utilizing both of these expedients. In a similar manner, longer intake passages 82 are provided for serving the cylinders 18, 19 and 21 from the plenum chamber 46. In all other regards, this embodiment operates the same as the previously described embodiment and this should be readily apparent to those skilled in the art from the foregoing description.

It should be readily apparent that the embodiments of the invention illustrated and described are very efficient in providing a good torque curve for the engine through its entire speed and load ranges. Although two embodiments of the invention have been illustrated and described, various changes and modifications may be made without departing from the spirit and scope of the invention, as defined by the appended claims.

I claim:

1. An induction system for an internal combustion engine comprising at least two variable volume chambers each having at least one intake port for delivering a charge thereto, a plenum chamber, a first intake passage extending from said plenum chamber to the intake port of a first of said chambers, a second intake passage extending from said plenum chamber to the intake port of the other of said chambers, a flow control valve operable in response to an engine running characteristic for controlling the flow through said second intake passage, first and second atmospheric air inlets to said plenum chamber, and throttle valve means for controlling the flow into said plenum chamber through each of said atmospheric air inlets.

2. An induction system as set forth in claim 1 wherein the throttle valve means comprises first and second throttle valves for controlling the flow through the first and second atmospheric air inlets, respectively.

3. An induction system as set forth in claim 1 wherein the atmospheric air inlets open into the plenum chamber at different longitudinal locations.

4. An induction system as set forth in claim 3 wherein the throttle valve means comprises first and second throttle valves for controlling the flow through the first and second atmospheric air inlets, respectively.

5. An induction system as set forth in claim 4 wherein the atmospheric air inlets have different effective cross-sectional areas.

6. An induction system as set forth in claim 1 wherein the atmospheric air inlets have different effective cross-sectional areas.

7. An induction system as set forth in claim 6 wherein the throttle valve means comprises first and second throttle valves for controlling the flow through the first and second atmospheric air inlets, respectively.

8. An induction system as set forth in claim 1 wherein each of the variable volume chambers has two intake passages serving it from the plenum chamber.

9. An induction system as set forth in claim 8 wherein the intake passages have different effective lengths.

10. An induction system as set forth in claim 9 wherein the throttle valve means comprises first and second throttle valves for controlling the flow through the first and second atmospheric air inlets, respectively.

11. An induction system as set forth in claim 10 wherein the atmospheric air inlets open into the plenum chamber at different longitudinal locations.

12. An induction system as set forth in claim 10 wherein the atmospheric air inlets have different effective cross-sectional areas.

13. An induction system as set forth in claim 12 wherein the atmospheric air inlets open into the plenum chamber at different longitudinal locations.

14. An induction system for an internal combustion engine having at least two cylinders, a first plenum chamber, a second plenum chamber, conduit means for delivering a charge from said plenum chambers to said cylinders for induction thereto, the improvement comprising a common atmospheric air inlet for each of said plenum chambers at one end thereof, an interconnecting passageway extending between the other end of said plenum chamber, a single throttle valve for controlling the flow into each of said plenum chambers through said common atmospheric inlet and a single throttle valve for controlling the flow through said interconnecting passageway.

15. An induction system as set forth in claim 14 wherein the conduit means comprises a first conduit extending from each of said plenum chambers to an intake passage of one cylinder, and a second conduit extends from each of said plenum chambers to an intake passage of the other of said cylinder.

16. An induction system as set forth in claim 15 wherein the first conduit means has a different effective length than the second conduit means.

17. An induction system as set forth in claim 16 wherein the conduit means extend to different ports of the cylinder.

18. An induction system as set forth in claim 14 wherein the cylinders are disposed in non-aligned relation to each other and the plenum chambers lie above respective cylinder heads closing the respective cylinders.

19. An induction system as set forth in claim 14 wherein the means for delivering a charge to the cylinders from the plenum chambers comprise a pair of different length intake passages.

20. An induction system as set forth in claim 18 wherein the cylinders are disposed in non-aligned relation to each other and the plenum chambers lie above respective cylinder heads closing the respective cylinders.

* * * * *